United States Patent [19]
Daugny et al.

[11] 3,745,574
[45] July 10, 1973

[54] RADAR TELEMETRING SYSTEM

[75] Inventors: Bertrand Daugny, Neuilly-sur-Seine; Jean Schifrine, Vaucresson, both of France

[73] Assignee: Electronique Marcel Dassault, Paris, France

[22] Filed: June 8, 1971

[21] Appl. No.: 151,109

[52] U.S. Cl. ............... 343/7 A, 343/7 TA, 343/7.3
[51] Int. Cl. .............................................. G01s 9/06
[58] Field of Search............... 343/16 M, 7 A, 7 TA, 343/7.3

[56] References Cited
UNITED STATES PATENTS

| | | |
|---|---|---|
| 3,213,447 | 10/1965 | Burrows et al. ................... 343/7 TA |
| 3,392,387 | 7/1968 | Kirkpatrick ..................... 343/16 M |
| 3,353,180 | 11/1967 | Anderson ......................... 343/16 M |
| 3,309,701 | 3/1967 | Bollinger et al. .................. 343/16 M |
| 3,449,745 | 6/1969 | Holt, Jr. ........................... 343/16 M |
| 3,599,208 | 8/1971 | Nelson .............................. 343/7 A |

Primary Examiner—Benjamin A. Borchelt
Assistant Examiner—G. E. Montone
Attorney—Karl F. Ross

[57] ABSTRACT

A radar telemetering system for pinpointing targets employs means for defining, on the basis of incoming echo pulses, a line or plane of referance dividing the space into two off-boresight zones. The radar receiver supplies signal pulses to a range-gate selector in response to the arriving echoes, the selector controlling in turn an off-boresight-angle discriminator whose d-c output voltage readjusts the selector in a sense tending to reduce the discriminator output to zero.

5 Claims, 5 Drawing Figures

RADAR TELEMETRING SYSTEM

The present invention relates to radar systems for pinpointing a target in a telemetering radar, more particularly but not exclusively to airborne telemetering radar aystems for use in air to ground attack by aircraft.

An object of the present invention is to improve such radar systems to make them as accurate as possible without greatly increasing their weight, size, complexity or production costs.

The radar receiver described herein is capable of defining a line or at least a plane in space with the aid of a conventional device called an "angle discriminator". The radar receiver further includes a conventional range-gate selector.

According to the invention the radar receiver comprises a servo-control loop so designed that, on the one hand, the reflected wave energy arriving at this receiver gives rise to echo pulses supplied to a range-gate selector which in turn controls an angle discriminator and that, on the other hand, the range gate or telemetering window of this selector is shifted by a d-c voltage obtained from the output of the discriminator, preferably through the intermediary of an amplifier, in a direction which tends to nullify this output voltage. Such a d-c voltage, as is well known per se, corresponds in sign and magnitude to the deviation of the target position from the reference line or plane established by the discriminator.

Other features will be brought out in the following description, given with reference to the accompanying drawing, wherein.

Figure 1:
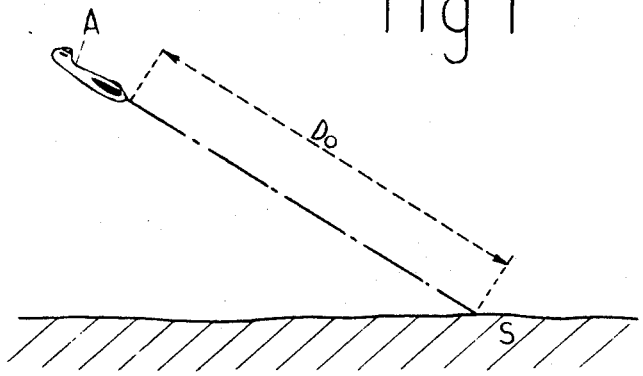
FIG. 1 illustrates the use of an airborne radar system on an airplane engaged in ground attack.

Radar telemeters and nno particular telemeters for use in firing from an airplane for attacking ground targets must satisfy certain requirements. Notably, the target distance Do (FIG. 1) is measured along a line related to the aircraft A which may in fact be a line parallel to or coinciding with the longitudinal axis of the aircraft and which 14 generally referred to as the boresight. The indicatlon must be automatic, i.e. requiring no manual adjustment. It must be simple, preferably readable directly by the displacement of a needle or pointer on to a fixed dial. Finally, it must also give the distance from the target on the ground S with the greatest possible precision and not merely as an approximation which would encompass zones situated in the proximity of the actual target.

Figure 2:
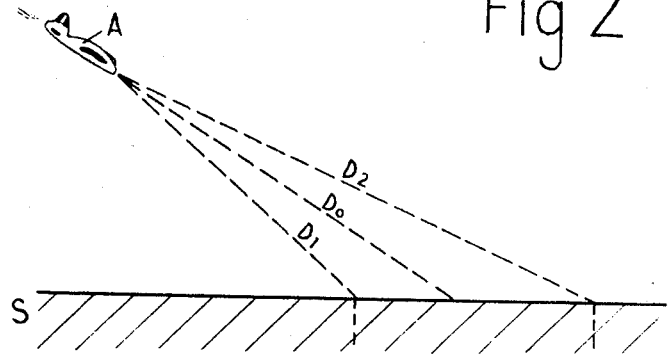
FIG. 2 shows the actual angular range of such a radar system.

Unfortunately, as it appears from FIG. 2, since radar equipment and therefore hertzian echoes are involved, it would be necessary, if only an extremely limited area of the ground were to be hit, to use an antenna or aerial with an extremely narrow scanning beam : such an antenna would have dimensions which would be prohibitive for equipment aboard an aircraft.

In practice, the antennas of small dimensions currently in use scan relatively wide areas of the ground for which the distance varies from D1 to D2 and within this area an automatic telemeter has no way of choosing the echo along the axis corresponding to distance Do.

It is known, however, to define in the range scanned by the radar two zones on either side of a plane of reference passing through the axis of the aircraft or even on opposite sides of this axis itself. For example, according to the so-called "monopulse" receiving method operating with either two or four antennas, by using the phase differences between the echoes of a transmitted pulse and depending on whether the echo comes from one zone or the other, an off-boresight-angle discriminator generating a voltage which is an algebraic function of the angular position (here the elevation angle) of any objective with respect to the aircraft plane considered (or even the axis). It should also be noted that there are other methods which may be used within the scope of the present invention for defining for a radar receiver a reference plane axis in space, either through conical or planar scanning by movements of the antenna or with electrical switching.

Figure 3:
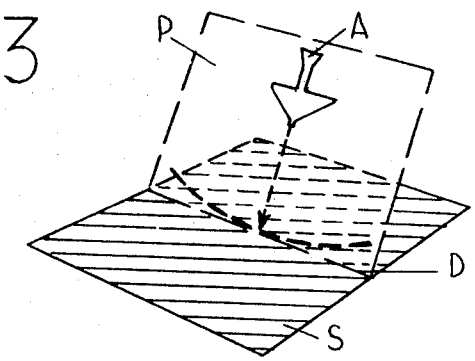
FIG. 3 is a perspective view corresponding to FIG. 2.

It will be assumed, for the sake of simplicity, that the plane of reference considered (P, FIG. 3) contains the longitudinal axis of the aircraft. When the aircraft dives toward the ground S, the plane of reference P defines on the ground a reference line D whose distance to the aircraft is to be measured.

Figure 4:
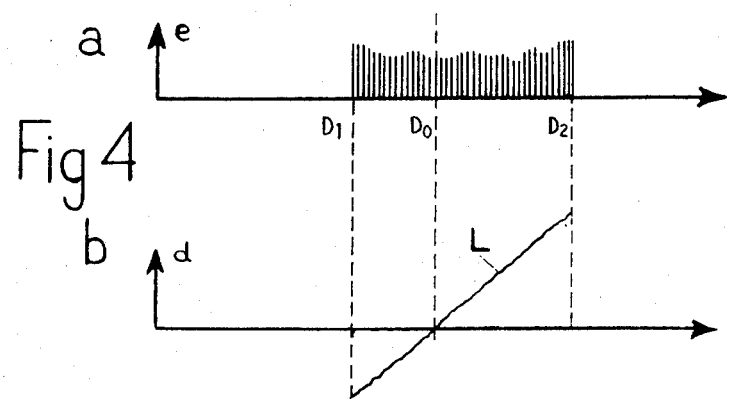
FIG. 4 shows in graph $a$ the energy received by the receiver and in graph $b$ the energy received by the angle discriminator.

In FIG. 4 the graph $a$ schematically shows the distribution of the energy $e$ received (returned echoes) as a function of the distance which in the case of FIG. 2 varies between D1 and D2. Graph $b$ shows the characteristic L of the voltage $d$ provided by the off-boresight-angle discriminator. This voltage is an algebraic function of the off-boresight angle and, at least in the vicinity of the zone being considered, can be assumed to be a straight line. It is seen that the voltage $d$ is negative between D1 and Do, positive between Do and D2 and nil at Do.

The radar receiver usually comprises a range-gate selector generally constituted by an electronic switch or gate which gives passage to echo pulses only at the end of an adjustable delay.

The system according to the invention includes servo-control means for shifting the position of the range gate by the output voltage of the off-boresight-angle discriminator. If the servo-control is appropriately set, the system tends to automatically nullify the off-boresight voltage provided by the output of the discriminator amplifier. The position of the range gate thus corresponds to the distance between the reference line and the aircraft distance being visualized on an indicator.

Figure 5:
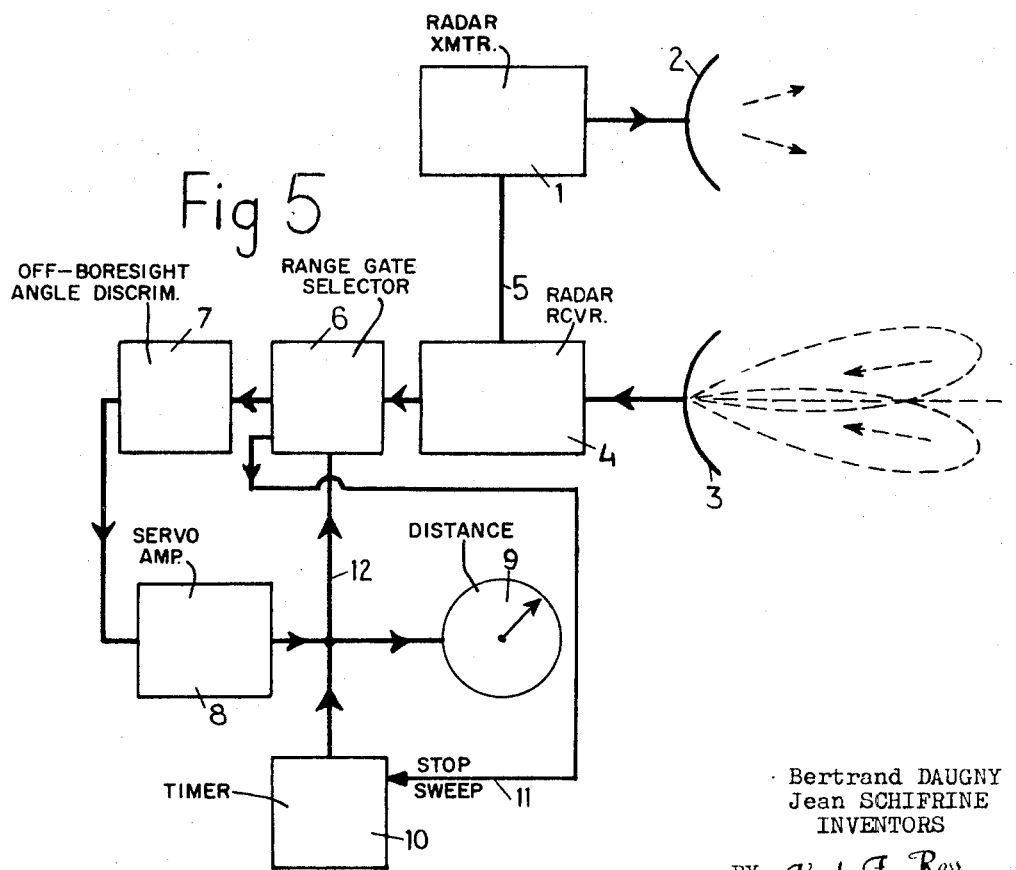
FIG. 5 shows a block diagram of the radar system according to the invention.

The radar telemeter according to the invention is advantageously constructed according to the block diagram of FIG. 5 which shows a radar transmitter 1 having a transmission antenna or aerial 2 for high-frequency wave energy, a receiving antenna or aerial 3 for reflected wave energy connected to the input 4 (high-frequency and intermediate frequency part) of the receiver which on the other hand is connected to the transmitter as indicated at 5 (the transmitting and receiving antennas could, however, be combined into a single antenna in some instances), a range-gate selector 6 an off-boresight-angle discriminator 7, a servo-control amplifier 8 and a distance indicator with a needle or distance scale.

The intermediate-frequency part of the receiver 4 feeds echo pulses to the selector 6 which in turn feeds them to the discriminator 7, selector 6 being controlled by a d-c voltage on a lead 12 obtained by way of the ampliier 8 from the output voltage of the discriminator 7, lead 12 forming part of a servo-control loop which determines th delay of the range-gate selector 6.

Further, an auxiliary timer 10 constructed in any conventional manner (for instance as a saw-tooth generator) assures in the absence of echoes a periodic displacement of the range gate in the normal range of echo-pulse reception.

Scanning is automatlally interrupted upon the receipt of echo pulses, clearing the selector 6, by means known per se which are schematically represented by a lead 11 extending between the elements 6 and 10 of the radar system. This interruption of the normal exploratory sweep makes the selector 6 receptive to the output of the servo amplifier 8 which shifts the range gate or telemetering window thereof into a time position corresponding to the target distance $D_o$ indicated by the disappearance of the output signal from discriminator 7.

Our improved radar system which enables the telemetering of a point target, can also be used for other purposes such as the detection of missiles or even various obstacles if the source of sweep voltages on control input 12 is suitably modified.

the present improvement may be applied to onventional radar systems without substantial modification thereof so that a particularly useful unit is obtained with very slight increases in weight, size and production cost.

We claim:

1. A radar telemetering system comprising:
    transmitting means for wave enegy to be reflected by a target to be pinpointed;
    receiving means for generating echo pulses in response to wave energy reflected by a target;
    selector means forming a shiftable range gate for incoming echo pulses from said receivlng means;
    discriminator means connected to said selector means for receiving therefrom the echo pulses passing said range gate, said discriminator means having a d-c output voltage corresponding in sign and magnitude to the deviation of a reflecting target from a reference plane having a predetermined orientation relative to said transmitting and receiving means; and
    servo means connected to said discriminator means for feeding said output voltage to a control input of said selector means to shift said range gate to a time position in which said output voltage goes to zero.

2. A system as defined in claim 1 wherein said servo means comprises an amplifier working into said control input.

3. A system as defned in claim 1, further comprising scanning means connected to said control input for normally displacing said range gate in a repetitive sweep, and stop means responsive to echo pulses passing said range gate for arresting said scanning means, thereby making said selector means receptive to said output voltage.

4. A system as defined in claim 3, further comprising indicator means connected to said scanning means for registering target distance 5. a system as defined in claim 1 mouted aboard an aircraft, said reference plane including the longitudinal axis of said aircraft.

* * * * *